Aug. 29, 1939. W. C. WALTER 2,171,104
VEHICLE BUMPER
Filed Sept. 28, 1936
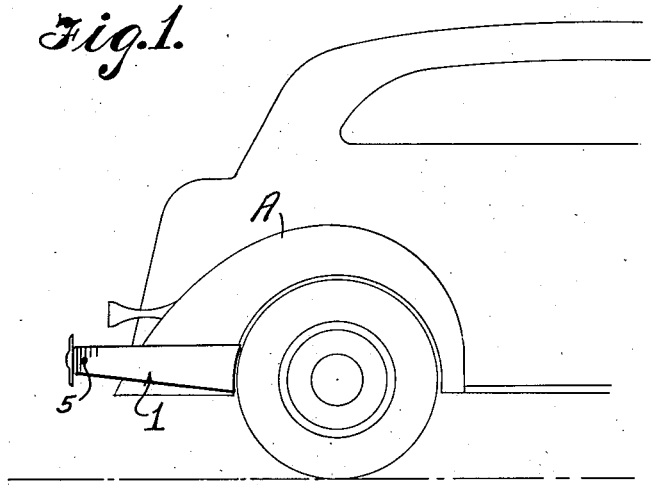
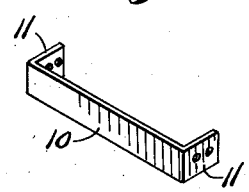
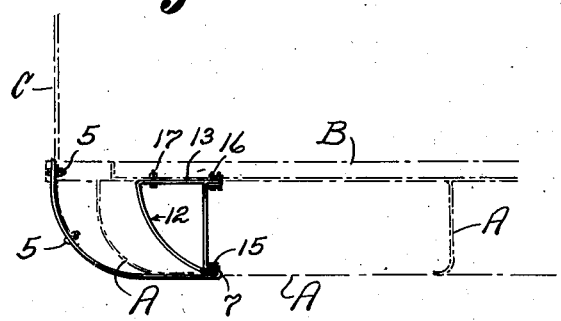
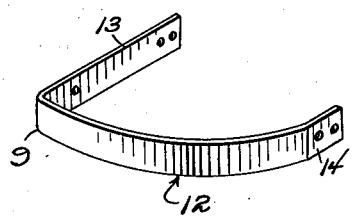
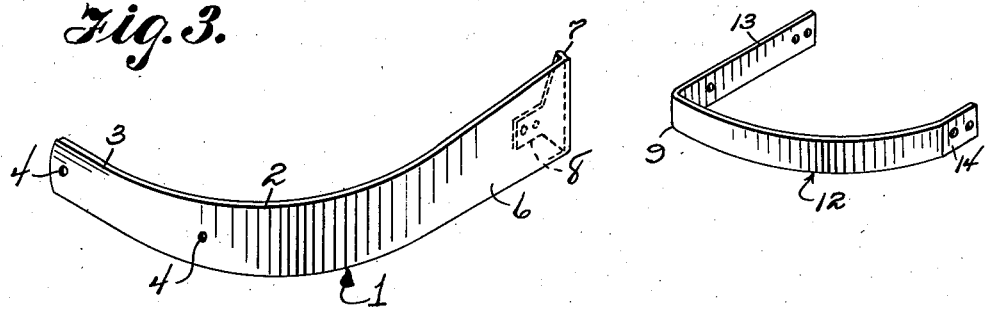
Wilfrid C. Walter
INVENTOR
BY Victor J. Evans & Co.
ATTORNEYS Patented Aug. 29, 1939

2,171,104

UNITED STATES PATENT OFFICE 2,171,104

VEHICLE BUMPER

Wilfrid C. Walter, Arcata, Calif.

Application September 28, 1936, Serial No. 102,992

2 Claims. (Cl. 293—57)

This invention relates to vehicle bumpers, and its general object is to provide side bumpers that are primarily designed to protect the rear stream line fenders of the present day automobiles, as well as the fuel tank inlet spouts, tail lights and other accessories and parts of the vehicle that are disposed laterally of the rear end thereof, in that my bumpers are attached to the ends of the bumpers now in general use and extend about the lower side portions of the fenders adjacent to their lower ends.

A further object of the invention is to provide a bumper of the character set forth, that can be installed or applied to a vehicle, in an easy and expeditious manner, materially adds to the beauty of the vehicle, is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary view illustrating one of my bumpers applied to a vehicle.

Figure 2 is a top plan view of the bumper in applied position.

Figure 3 is a perspective view of the bumper bar.

Figure 4 is a perspective view of one of the brackets of my bumpers.

Figure 5 is a similar view of the other bracket.

Referring to the drawing in detail, and particularly to Figures 1 and 2, the letter A indicates the right hand rear fender of a motor vehicle, B the frame of the vehicle and C the rear bumper, the latter being of a type now in general use and which together with the parts just mentioned form no part of the present invention.

It will of course be understood that a bumper bar is disposed upon opposite sides of the vehicle, and while these bars are similar, they differentiate in one respect, that is they are not interchangeable for either side of the vehicle, due to the fact that the lower edges thereof are inclined downwardly from their rear to their front ends as clearly shown in Figure 1. However, each of the bars which are indicated by the reference numeral 1, includes a curved intermediate portion 2, and a straight rear end portion 3 which together with the curved intermediate portion 2 has openings 4 therein to receive the bolts of bolt and nut connections 5 to secure the bars to the end portions of the rear bumper C as shown in Figure 2.

Due to the downwardly inclined lower edges of the bars, as previously set forth, they are gradually enlarged as shown in Figure 1 toward their front ends to provide relatively wide straight, forwardly directed portions 6, and the forward portions 6 terminate in hooked ends 7 for disposal about the forward edge of the rear portion of the fender A as best shown in Figure 2. The hooked ends are reduced to provide apertured ears 8 that are disposed parallel with and spaced from the portion 6 to cooperate therewith for clamping association with the fender.

In order to fixedly associate the bumper bars with respect to the frame of the vehicle, I employ a substantially V-shaped bracket 9, and a straight bracket 10 that has right angle bent ends 11. These brackets are best shown in Figures 4 and 5. The bracket 9 is provided with a curved outer arm 12 and a straight inner arm 13, the arm 12 terminating in its free end in a straight portion 14 having openings therein to register with openings in one of the right angle bent ends 11 to receive bolt and nut connections 15 for securing the brackets together at the outer ends thereof, and the bolts of the bolt and nut connections 15 likewise extend through the apertured ears 8, while the inner right angle bent end 11 together with the straight inner arm 13 is fixed to the frame by bolt and nut connections 16, and the inner arm 13 is likewise fixed to the frame by a bolt and nut connection 17. Due to the structure of the brackets 9 and 10 it will be apparent that they can be used on either side of the vehicle or in other words are interchangeable accordingly.

From the above description and disclosure of the drawing, it will be obvious that I have provided bumpers that not only add materially to the appearance of a vehicle, as will be noted upon inspection of Figure 1, but will adequately protect the side and rear portions of the rear fenders, as well as accessories and parts of the vehicle that are disposed laterally of the rear end thereof and which are not now protected by bumpers in general use.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A side bumper for a motor vehicle comprising a bar shaped for disposal about the side of the rear end of the vehicle, said bar being tapered inwardly from its front to its rear end and including a curved intermediate portion, a straight rear end portion and a straight front end portion, means for securing the bar to the rear bumper bar of the vehicle and extending through the straight rear end portion and intermediate portion respectively, said straight front end portion being engageable with the rear side portion of the rear fender of the vehicle, a hooked free end for the straight front end portion for disposal about the front edge of the rear side portion of the frame, a substantially V-shaped bracket disposed between the frame and the hooked free end, a straight bracket between the arms of the substantially V-shaped bracket, and means for securing the brackets to the frame and hooked free end.

2. A side bumper for a motor vehicle comprising a bar shaped for disposal about the side of the rear end of the vehicle, said bar having a lower edge upwardly inclined toward the rear end thereof, and including a curved intermediate portion, a straight rear end portion and a straight front end portion, means for securing the bar to the rear bumper bar of the vehicle and extending through the straight rear end portion and intermediate portion respectively, said straight front end portion being engageable with the rear side portion of the rear fender of the vehicle, a hooked free end for the straight front end portion for disposal about the front edge of the rear side portion of the fender, a substantially V-shaped bracket including a curved arm and a straight arm, a straight bracket bridging the arms, means for securing the straight arm and straight bracket to the frame of the vehicle and means for securing the curved arm and straight bracket to the hooked free end for supporting the straight front end portion with respect to the frame.

WILFRID C. WALTER.